Figure 1:
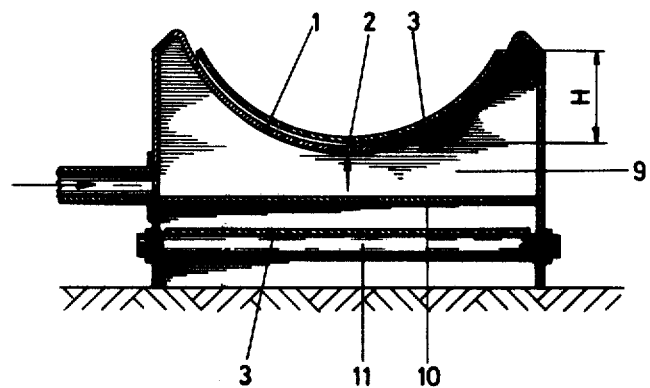

United States Patent [19]

Jonkers

[11] 4,185,736

[45] Jan. 29, 1980

[54] BELT CONVEYOR AND A BELT FOR USE THEREON

[76] Inventor: Cornelius O. Jonkers, Morshoekweg 5, Hengelo (O), Netherlands

[21] Appl. No.: 811,767

[22] Filed: Jun. 30, 1977

Related U.S. Application Data

[63] Continuation-in-part of Ser. No. 594,813, Jul. 10, 1975, abandoned.

[30] Foreign Application Priority Data

Jul. 11, 1974 [NL] Netherlands .................... 7409412

[51] Int. Cl.² ............................................. B65G 15/60
[52] U.S. Cl. ..................................... 198/811; 198/823
[58] Field of Search ..................... 198/823, 820, 811

[56] References Cited

U.S. PATENT DOCUMENTS 2,505,354   4/1950   Gartrell et al. ........................ 198/823

FOREIGN PATENT DOCUMENTS 1934347   5/1970   Fed. Rep. of Germany .......... 198/820
2119553  10/1971   Fed. Rep. of Germany .......... 198/811
623010    5/1949   United Kingdom .................... 198/820

Primary Examiner—Robert B. Reeves
Assistant Examiner—Douglas D. Watts
Attorney, Agent, or Firm—Fleit & Jacobson

[57] ABSTRACT

The invention relates to a conveyor comprised of an arcuate endless belt, a stationary trough below the belt and a device including perforations in the trough for introducing a fluid under pressure between the trough and the belt to support the belt. The belt is flexible in planes perpendicular to its length to shape itself to the contour of the trough by virtue of its own weight.

3 Claims, 4 Drawing Figures

BELT CONVEYOR AND A BELT FOR USE THEREON

This application is a continuation in part of Ser. No. 594,813 filed July 10, 1975 and now abandoned.

This invention relates to a conveyor comprising, in combination, an endless moving arcuate, conveyor belt, a stationary trough below said belt and means including perforations in said trough for introducing a fluid under pressure between said trough and said belt to support said belt, said belt being flexible in planes perpendicular to its length so as to adapt itself in shape to the shape of the trough by its own weight.

Such conveyors are known, among others from British patent specifications Nos. 1.041.047 and 1.341.897. Such conveyors have the advantage that the belt is carried by the fluid under pressure such as air so as to move without mechanical contact with the trough, whereby wear is avoided and the energy needed to move the belt is decreased.

However, such conveyors sometimes have the disadvantage that, in unloaded condition, the belt is moved upwardly by the fluid under pressure, so that it will contact the trough along its side edges where this may cause considerable wear or there may be a considerable loss of energy by outflow of said fluid and, if the trough walls do not extend upwardly to a sufficient height, the belt may even be derailed or run off the trough.

The present invention aims at improving such belt conveyors by avoiding such disadvantages. This is obtained by giving the belt a particular shape and/or weight distribution together with a considerable flexibility in transverse sections to be described in detail below.

The result thereof is that the belt is better adapted to counteract such upward movements. The pressure of the fluid, if acting evenly on the lower surface of a belt, will give a high upwardly resulting force on the belt if the belt is in plane condition, but as soon as the belt is curved to have a concave upper surface and a convex lower surface, the resultant forces on parts of the belt to the sides of the central part are directed not only upwardly but also inwardly. The inwardly directed forces tend to keep the belt in a curved and concave shape so as not to leave the trough bottom too much. The invention promotes this curved condition of the belt by its own shape and/or by its uneven weight distribution together with its high flexibility and thereby, although the belt does not have an own shape corresponding to the shape of the trough, the belt will remain in the bottom of the trough much better and with much less chance of being lifted than normal belts.

With the matter of British patent specification No. 1.341.897 it is important that the fluid under pressure flows along the lower surface of the belt in a narrow space, so that viscous forces act on the belt to give a variable lifting force on the belt, adjusted to the local differences in load of the belt. This means differences in pressure locally in the fluid below the belt, but such differences are of course only possible if the belt has a very short distance to the trough in all areas. The use of the invention in such a system is thus of great importance, even greater than in systems where the static pressure of the fluid below the belt carries e.g. a belt which is very rigid in transverse sections and where the clearance between belt and trough may be considerable.

The manufacturing of such a belt is very simple. It is possible to form, mould and if desired cure the belt in a curved mould. It is also possible to start from a normal plane mould or die but to introduce intentionally a difference in shrinkage between the upper and lower layer of the belt, such that one layer shrinks more than the other layer. This will give a belt of which the own shape of the cross-section even in weightless condition is curved. This own shape of the belt is of course the shape which will be taken up if no forces act on the belt. Of course the weight will always act on the belt, but whether the belt has a certain concave shape or not and to what extent in weightless condition can easily be determined by suspending the belt vertically so that the weight does not disturb the shape taken up.

The invention will now be explained with reference to the drawings giving several preferred embodiments of a conveyor and a belt according to the invention.

Figure 2:
Figure 3:
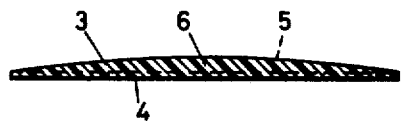
Figure 4:
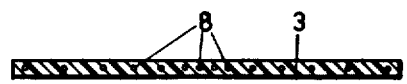

FIG. 1 shows a transverse vertical section through a conveyor with a belt according to the invention;

FIG. 2 gives a transverse section of a belt with a curved own shape;

FIG. 3 gives a transverse section of a belt with non-uniform distribution of weight over its cross-section in that the belt is thicker near the centre than near the edges; and FIG. 4 gives a transverse section through a belt with longitudinal steel wires having an uneven distribution of distances thereof over the belt to give an uneven weight distribution.

In FIG. 1 a metal trough 1 is shown as being circularly curved, but it may also have another shape such as trapezoidal with rounded edges known as such. In the bottom of the trough there is a number of openings, one of which is shown and indicated by 2, said openings being mainly provided near the central part of the trough and which may be present in any desired number and of any desired size. The trough 1 forms the upper wall of a box 9 having a bottom 10, to which closed box air under pressure is fed as shown diagrammatically at the left of FIG. 1. Said air (or if desired another fluid such as water) can leave the box 9 through the orifices 2.

A flexible conveyor belt 3 is provided in the trough 1 and the air or other pressure fluid leaving the openings 2 will be able to lift this belt somewhat to avoid mechanical contact between belt 3 and trough 1 and thus to avoid wear. By a correct choice of number, size and pattern of the openings 2, e.g. as indicated in British patent specification No. 1.341.897, it is possible by using the viscous effect of the fluid such as air that the belt also when loaded will remain floating above the trough without contacting it. However, there is the risk that the belt in unloaded condition will be blown upwardly to a straight horizontal shape on top of the side edges of the trough, where it will contact these side edges and give considerable wear, while it is also possible in such a situation that an enormous quantity of air will escape to give much loss of energy and the belt may even derail from the trough. To counteract this effect, the belt 3 in the preferred embodiment of FIG. 2 is made with an own shape being curved about as shown, if no forces act on the belt, not even its own weight. This is easily performed, e.g. by building up the belt from the usual layers of rubber, fibers or the like in a curved mould or by applying a difference in shrinkage of the material of the upper and the lower layers, so that the belt will take up a curved shape. The distance h of the curved belt in unloaded and weightless condition should according to the invention be more than 0.2 H, in which H is the same distance if the belt is present in the trough and follows the contour thereof as shown in FIG. 1. In any case h is smaller 0.8 H, so that the belt by its own weight and by the fluid under pressure will easily follow the contour of the trough, to which end the belt is also highly flexible as will be described in more detail below.

In FIGS. 3 and 4 transverse sections of belts according to the invention are shown, in which the belts in the central area between the side edges are heavier than along the side edges, although they are still considerably flexible. In FIG. 3 this is obtained by giving the belt in the central area a greater thickness than along the edges and this is shown somewhat exaggerated in FIG. 3, because in reality the belt will be wider and thinner to remain sufficiently flexible. In FIG. 3 there is a plane fibrous layer 4 having the same thickness, a lower layer 5 of the same thickness throughout and an upper layer 6 being thicker in the centre than at the edges. If the material of layers 5 and 6 is a rubber, there will be shrinkage during curing so that the belt will moreover tend to take up a shape according to FIG. 2, so that a combination of effects according to the invention is obtained in this belt, both an uneven weight distribution and a tendency to take up a curved or concave shape.

In FIG. 4 the belt has a rectangular cross-section but longitudinal weighting rovings, wires or cables 8, e.g. of steel, which as shown may be closer together in the central area of the belt than in the vicinity of the edges, so that this belt will be more heavy in the central area than along the edges. Another possibility for an uneven weighting is to use thicker wires or cables in the central area than near the edges.

In both cases of FIG. 3 and FIG. 4, a central portion equal to half the width of the belt has a weight of at least 55% and at most 70% of the total weight of the belt. If there is a combined effect as described with reference to FIG. 3, an uneven weight distribution and a curved shape in unsupported and weightless condition, the limits for both effects will be as described below.

As shown in FIG. 1, the return part of the belt 3 may be guided over usual rollers 11 below the box 9 and the belt is sufficiently flexible to take up a plane position on such rollers.

As stated, the belt has to have high flexibility in transverse sections. In fact, this should be between 3 and 5 times the flexibility necessary for the belt if supported along its side edges only by the trough walls to flex in order that the mid-point of the belt between the side edges just reaches the bottom of the trough. This flexibility will be explained in more detail below.

The International Organisation for Standardization ISO has published ISO standard 703 on Conveyor Belts-Troughability-Characteristic and Method of Test, First edition 1975-05-01, Ref. No. ISO 703-1975(E). This gives a test for the flexibility of conveyor belts by supporting a small length of such belts from vertical cables and measuring the vertical maximum deflection or sag of the belt downwardly with respect to the horizontal plane through its side edges supported by said cables. If the trough is known in shape and dimensions, it is known what will be the distance between a straight line through the edges of the belt and the mid-point of the belt if the belt would follow the shape of the trough so as to have its mid-point just reach the bottom of the trough and thus it is known what should be the flexibility of the belt. For a flexibility of 3 to 5 times this value the belt may well have to sag so much in the ISO-test, that this cannot be performed adequately, e.g. because the sagging is more than or about half the width of the belt. In such a case the ISO-test to determine this high flexibility may be performed with a piece of belt having half the width of the real belt. This gives a sagging in the ISO-test of about one sixteenth of the sagging of a belt piece of the full width, being about proportional to the fourth power of the width, so that for 3 to 5 times the flexibility the sagging for such a smaller width of belt would be between three sixteenth and five sixteenth of the sagging of a belt piece of full width if just following the shape of the trough. If desired, any other width of the piece of belt may be chosen, if only the total sagging is not higher than permitted for a reliable ISO-test, e.g. a width of two thirds or three quarters of the real belt. Also for an uneven weight distribution in the belt a part of the belt with smaller width may be used in the ISO-test, if only this is done so as to make it possible to derive the flexibility of the total belt reliably therefrom. The uneven weight distribution will be symmetrical with respect to a longitudinal plane through the mid-point of the transverse section of the belt, so that the ISO-test may be made with half the width of the belt in a part from the mid-point to a side edge of a transverse section, or the belt may be divided in three parts, a symmetrical central part and two symmetrical side parts for the tests.

If there is both an uneven weight distribution and an arcuate shape in unsupported and weightless condition of the belt as described above with reference to FIG. 3, these phenomena will preferably each be made responsible for about half the effect obtained by the combination, which means that the distance from the straight line through the edges of the belt to the mid-point of the belt is between 0.1 and 0.4 times this distance if the belt would follow the shape of the trough and that a central portion equal to half the width of the belt has a weight being at least 52.5% and at most 60% of the total weight of the belt.

The limits given above and in the attached claims have been found by obtaining a better insight into what really happens as to forces and flexing in a fluid-supported belt. It is not easy to make calculations to find such limits, but the following may help to give more insight into this point: The problems were approached by mainly using the theories, formulae etc. as given in the following literature:

(1) F. R. Shanley: "Strength of materials", p. 421–424 (Deflection of an Initially Curved Beam), McGraw-Hill, New York, 1957.

(2) R. Frisch-Flay: "On large deflections" Australian Journal of Applied Science, Dec. 1959, p. 418–432.

(3) K. E. Bisshop: "Approximation for large deflections of a cantilever beam" Quarterley of Applied Math., Jan. 1973, p. 521–526.

This was done in such a way that, as no analytical calculus was possible, a numerical iteration method was used, dividing the belt into a considerable number of areas with a very small width and calculating from an original unloaded condition and shape of the belt to the shape obtained by weight and fluid pressure, and from this shape to the influence of pressure and weight on this new shape to find a corrected shape etc. in several steps, known in many fields of engineering as an iteration method. For giving an idea about such a calculation an example is given below for a belt assumed to have initially, in unloaded condition, a circular shape of cross section, although the invention is of course not limited thereto. The following values are used:

B = width of belt b = projection of width of curved belt on horizontal plane;

$R_0$ = radius of transverse curvature of initially curved belt;

$\theta_O$ = angle between a vertical line through center point of the radius of said curvature and a line through said center point to the side edge of the belt in a plane transverse to the length of the belt;

$\phi$ = angle between said vertical line and any small area of the cross-section of the belt in said plane, considered for the iteration calculation;

$M_\phi$ = bending moment in the belt in a transverse plane in said small area at angle $\phi$;

p = pressure of fluid below belt perpendicular to belt surface;

q = weight of belt per unit width vertically downwards.

The length of the belt and of parts of the transverse sections thereof is assumed to be unity.

This gives a bending moment:

$$M_\phi = R_0^2 \cdot \left[ 2p \sin^2(\frac{\theta_0 - \phi}{2}) - q\{\cos \phi - \cos \theta_0 - (\theta_0 - \phi)\sin \phi\} \right],$$

rather simply to be found. As the belt should be in vertical equilibrium:

$$\tfrac{1}{2}bp = \tfrac{1}{2}Bq.$$

As $b = 2R_O \sin \theta_O$ and $B = 2R_O\theta_O$, it follows:

$$p = \frac{\theta_0}{\sin \theta_0} \cdot q.$$

which gives in the above formula for $M_\phi$:

$$M_\phi = q R_0^2 \left[ \frac{2 \theta_0}{\sin \theta_0} \sin^2(\frac{\theta_0 - \phi}{2}) - \{\cos \phi - \cos \theta_0 - (\theta_0 - \phi), \sin \phi\} \right].$$

It follows therefrom and in particular from the publication of Shanley as indicated above that in transverse sections for a very small element of the belt of width $\Delta S$ at angle $\phi$ the new radius of curvature R is given by:

$$\frac{1}{R} = \frac{1}{R_0} + \frac{M_\phi}{EI},$$

in which E is Young's coefficient(modulus) of elasticity and I is the inertia moment of bending, so that EI is the well known rigidity against bending of the belt in transverse direction.

By thus dividing the belt into a sufficiently large number of elements of small width $\Delta S$, it is possible to determine the new radius of curvature R of the belt as a function of $\phi$, thus giving the new shape of the belt by the weight and the bending effect of the fluid pressure on the belt. For this new shape the fluid pressure and the weight have, however, an influence different from the influence in the calculation for the originally assumed shape and the bending moments for this new shape are thus also different, as may now be calculated, and thus through the above formula for $M_\phi$ etc. the new radii of curvature may be determined, again giving a new shape giving a different influence of fluid pressure and weight and different bending moments. In this way, the real outcome may be approximated sufficiently in three steps of iteration. Therefrom the limits of preferred curvature in weightless condition of the belt may be derived.

For a belt of uneven weight distribution in essence the same calculation may be made, but with a weight per unit width q of the belt being not equal over the width of the belt. This will require usually more than three iteration steps to approach reality sufficiently, but the method is the same. The numerical calculations are not in essence difficult, but take rather much computer time.

In both cases it can be shown that the belt should be very flexible in transverse direction and thus EI, the rigidity against bending in transverse direction, as indicated above, should be low, giving a flexibility considerably higher than that of a flat belt which in the trough would follow the shape thereof by its own weight, as described above.

What I claim is:

1. A conveyor comprising, in combination, an endless moving, arcuate conveyor belt, a stationary trough below said belt and means including perforations in said trough for introducing a fluid under pressure between said trough and said belt to support said belt, said belt having longitudinally extending said edges and an arcuate transverse cross-sectional shape in an unsupported and weightless condition being different from the cross-sectional shape of the trough so that in said unsupported and weightless condition the mid-point of said belt between the side edges is at a distance from a straight line through the edges of the cross-section of the belt between 0.2 and 0.8 times this distance if the belt would be in the trough and would follow the shape thereof, said belt being made of a flexible material with a flexibility being between 3 and 5 times the flexibility necessary for the belt if supported along its side edges only by the trough walls to flex in order that said mid-point just reaches the bottom of the trough.

2. A conveyor comprising, in combination, an endless moving conveyor belt, a stationary trough below said belt and means including perforation in said trough for introducing fluid under pressure between said trough and said belt, said belt having longitudinally extending side edges and continuous top and bottom surfaces extending between said side edges, said belt having a transversely extending central portion of greater weight than each of the side portions extending between said central portion and the adjacent side edges of said belt so that a central portion equal to half the width of the belt has a weight of at least 55% and at most 70% of the total weight of the belt, said belt being made of a flexible material with a flexibility being between 3 and 5 times the flexibility necessary for the belt if supported along its side edges by the trough walls to flex in order that the mid-point of said belt between the side edges just reaches the bottom of the trough.

3. A conveyor comprising, in combination, an endless moving conveyor belt, a stationary trough below said belt and means including perforations in said trough for introducing fluid under pressure between said trough and said belt, said belt having longitudinally extending side edges and continuous top and bottom surfaces extending between said side edges, said belt having an arcuate transverse cross-sectional shape in an unsupported and weightless condition different from the cross-sectional shape of the trough so that in said unsupported and weightless condition a distance between the mid-point of the belt between the side edges and a straight line through the side edges of the cross-section of the belt is between 0.1 and 0.4 times this distance if the belt would be in the trough and would follow the shape thereof, said belt having a transversely extending central portion of greater weight than each of the side portions extending between said central portion and the adjacent side edges of said belt so that a central portion equal to half the width of the belt has a weight being at least 52.5% and at most 60% of the total weight of the belt, said belt being made of a flexible material with a flexibility being between 3 and 5 times the flexibility necessary for the belt if supported along its side edges by the trough walls to flex in order that said mid-point of said belt just reaches the bottom of the trough.

* * * * *